(12) United States Patent
Peterson et al.

(10) Patent No.: US 12,093,561 B2
(45) Date of Patent: Sep. 17, 2024

(54) SYSTEM AND METHOD OF STORING DATA

(71) Applicant: Dell Products L.P., Round Rock, TX (US)

(72) Inventors: Chris Everett Peterson, Austin, TX (US); Jeffrey James DeMoss, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 104 days.

(21) Appl. No.: 17/814,217

(22) Filed: Jul. 21, 2022

(65) Prior Publication Data

US 2024/0028257 A1 Jan. 25, 2024

(51) Int. Cl.
*G06F 3/06* (2006.01)
(52) U.S. Cl.
CPC .......... *G06F 3/0658* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 10,140,067 B1* | 11/2018 | Horn | ..................... | G06F 3/0659 |
| 2015/0331637 A1* | 11/2015 | Aguilar | ................ | G06F 3/0619 |
| | | | | 711/103 |
| 2016/0034342 A1* | 2/2016 | Toh | ..................... | G06F 11/1072 |
| | | | | 714/764 |
| 2021/0341978 A1* | 11/2021 | Shabbir | .................. | G06F 1/206 |
| 2023/0125348 A1* | 4/2023 | Kulkarni | .............. | F04D 27/002 |
| | | | | 415/220 |

* cited by examiner

*Primary Examiner* — Charles Rones
*Assistant Examiner* — Ryan Dare
(74) *Attorney, Agent, or Firm* — McDermott Will & Emery LLP

(57) ABSTRACT

In one or more embodiments, one or more systems, one or more methods, and/or one or more processes may: determine a first value associated with vibrations within an information handling system (IHS); determine that the first value meets or exceeds a first threshold value; after determining that the first value meets or exceeds the first threshold value: receive first data to store via at least one hard disk drive; and store the first data via at least one solid state memory medium; determine a second value associated with vibrations within the IHS; determine that the second value does not meet or exceed the first threshold value; and in response to determining that the second value does not meet or exceed the first threshold value: retrieve the first data from the at least one solid state memory medium; and store the first data via the at least one hard disk drive.

20 Claims, 8 Drawing Sheets

SYSTEM AND METHOD OF STORING DATA

BACKGROUND

Field of the Disclosure

This disclosure relates generally to information handling systems and more particularly to storing data.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may determine a first value associated with vibrations within an information handling system; may determine that the first value associated with the vibrations meets or exceeds a first threshold value; after determining that the first value associated with the vibrations meets or exceeds the first threshold value: may receive first data to store via the at least one hard disk drive; and may store the first data via the at least one solid state memory medium; may determine a second value associated with vibrations within the information handling system; may determine that the second value associated with the vibrations does not meet or exceed the first threshold value; and in response to determining that the second value associated with the vibrations does not meet or exceed the first threshold value: may retrieve the first data from the at least one solid state memory medium; and may store the first data via the at least one hard disk drive. In one or more embodiments, the one or more systems, the one or more methods, and/or the one or more processes may further: after determining that the second value associated with the vibrations does not meets or exceeds the first threshold value: receive second data to store via the at least one hard disk drive; and store the second data via the at least one hard disk drive.

In one or more embodiments, the one or more systems, the one or more methods, and/or the one or more processes may further: determine a third value associated with vibrations within the information handling system; determine that the third value associated with the vibrations meets or exceeds the first threshold value; after determining that the third value associated with the vibrations meets or exceeds the first threshold value: receive third data to store via the at least one hard disk drive; based at least on determine that the third value associated with the vibrations meets or exceeds the first threshold value, store the third data via the at least one solid state memory medium; receive fourth data to store via the at least one hard disk drive; based at least on determining that the third value associated with the vibrations meets or exceeds the first threshold value, store the fourth data via the at least one solid state memory medium; determine that a first amount of data stored via the at least one solid state memory medium meets or exceeds a second threshold value; in response to determining that the first amount of data stored via the solid state memory medium meets or exceeds the second threshold value, provide a first message to at least one of the at least one processor, the operating system, and the at least one application.

In one or more embodiments, the one or more systems, the one or more methods, and/or the one or more processes may further: determine a fourth value associated with vibrations within the information handling system; determine that the fourth value associated with the vibrations does not meet or exceed the first threshold value; and in response to determining that the fourth value associated with the vibrations does not meet or exceed the first threshold value: retrieve the third data from the at least one solid state memory medium; and store the third data via the at least one hard disk drive.

In one or more embodiments, the one or more systems, the one or more methods, and/or the one or more processes may further: after determining that the third value associated with the vibrations meets or exceeds the first threshold value: receive fifth data to store via the at least one hard disk drive; based at least on determining that the third value associated with the vibrations meets or exceeds the first threshold value, store the fifth data via the solid state memory medium; determine that a second amount of data stored via the at least one solid state memory medium meets or exceeds a third threshold value; in response to determining that the second amount of data stored via the at least one solid state memory medium meets or exceeds the third threshold value, provide a second message to the at least one of the at least one processor of the information handling system, the operating system, and the application.

In one or more embodiments, the one or more systems, the one or more methods, and/or the one or more processes may further: determine a third value associated with vibrations within the information handling system; determine that the third value associated with the vibrations does not meet or exceed the third threshold value; and in response to determining that the third value associated with the vibrations does not meet or exceed the third threshold value: retrieve the third data from the at least one solid state memory medium; store the third data via the at least one hard disk drive; retrieve the fourth data from the at least one solid state memory medium; and store the fourth data via the at least one hard disk drive. In one or more embodiments, the at least one solid state memory medium may include at least on of a solid state drive and a solid state volatile memory medium.

In one or more embodiments, a storage controller may be configured to: determine a first value associated with vibrations within an information handling system; determine that the first value associated with the vibrations meets or exceeds a first threshold value; after determining that the first value associated with the vibrations meets or exceeds the first threshold value: receive first data to store via at least one hard disk drive coupled to the storage controller; and based at least on determining that the first value associated with the vibrations meets or exceeds the first threshold value, store the first data via at least one solid state memory medium coupled to the storage controller; determine a second value associated with vibrations within the information handling system; determine that the second value associated with the vibrations does not meet or exceed the first threshold value; and in response to determining that the second value associated with the vibrations does not meet or exceed the first threshold value: retrieve the first data from the at least one solid state memory medium; and store the first data via the at least one hard disk drive. In one or more embodiments, the storage controller may be further configured to: after determining that the second value associated with the vibrations does not meets or exceeds the first threshold value: receive second data to store via the at least one hard disk drive; and store the second data via the at least one hard disk drive.

In one or more embodiments, the storage controller may be further configured to: determine a third value associated with vibrations within the information handling system; determine that the third value associated with the vibrations meets or exceeds the first threshold value; after determining that the third value associated with the vibrations meets or exceeds the first threshold value: receive third data to store via the at least one hard disk drive; based at least on determine that the third value associated with the vibrations meets or exceeds the first threshold value, store the third data via the at least one solid state memory medium; receive fourth data to store via the at least one hard disk drive; based at least on determining that the third value associated with the vibrations meets or exceeds the first threshold value, store the fourth data via the at least one solid state memory medium; determine that a first amount of data stored via the at least one solid state memory medium meets or exceeds a second threshold value; in response to determining that the first amount of data stored via the solid state memory medium meets or exceeds the second threshold value, provide a first message to at least one of the at least one processor, the operating system, and the at least one application.

In one or more embodiments, the storage controller may be further configured to: determine a fourth value associated with vibrations within the information handling system; determine that the fourth value associated with the vibrations does not meet or exceed the first threshold value; and in response to determining that the fourth value associated with the vibrations does not meet or exceed the first threshold value: retrieve the third data from the at least one solid state memory medium; and store the third data via the at least one hard disk drive.

In one or more embodiments, the storage controller may be further configured to: after determining that the third value associated with the vibrations meets or exceeds the first threshold value: receive fifth data to store via the at least one hard disk drive; based at least on determining that the third value associated with the vibrations meets or exceeds the first threshold value, store the fifth data via the solid state memory medium; determine that a second amount of data stored via the at least one solid state memory medium meets or exceeds a third threshold value; in response to determining that the second amount of data stored via the at least one solid state memory medium meets or exceeds the third threshold value, provide a second message to the at least one of the at least one processor of the information handling system, the operating system, and the application.

In one or more embodiments, the storage controller may be further configured to: determine a third value associated with vibrations within the information handling system; determine that the third value associated with the vibrations does not meet or exceed the third threshold value; and in response to determining that the third value associated with the vibrations does not meet or exceed the third threshold value: retrieve the third data from the at least one solid state memory medium; store the third data via the at least one hard disk drive; retrieve the fourth data from the at least one solid state memory medium; and store the fourth data via the at least one hard disk drive. In one or more embodiments, the at least one solid state memory medium may include at least on of a solid state drive and a solid state volatile memory medium.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
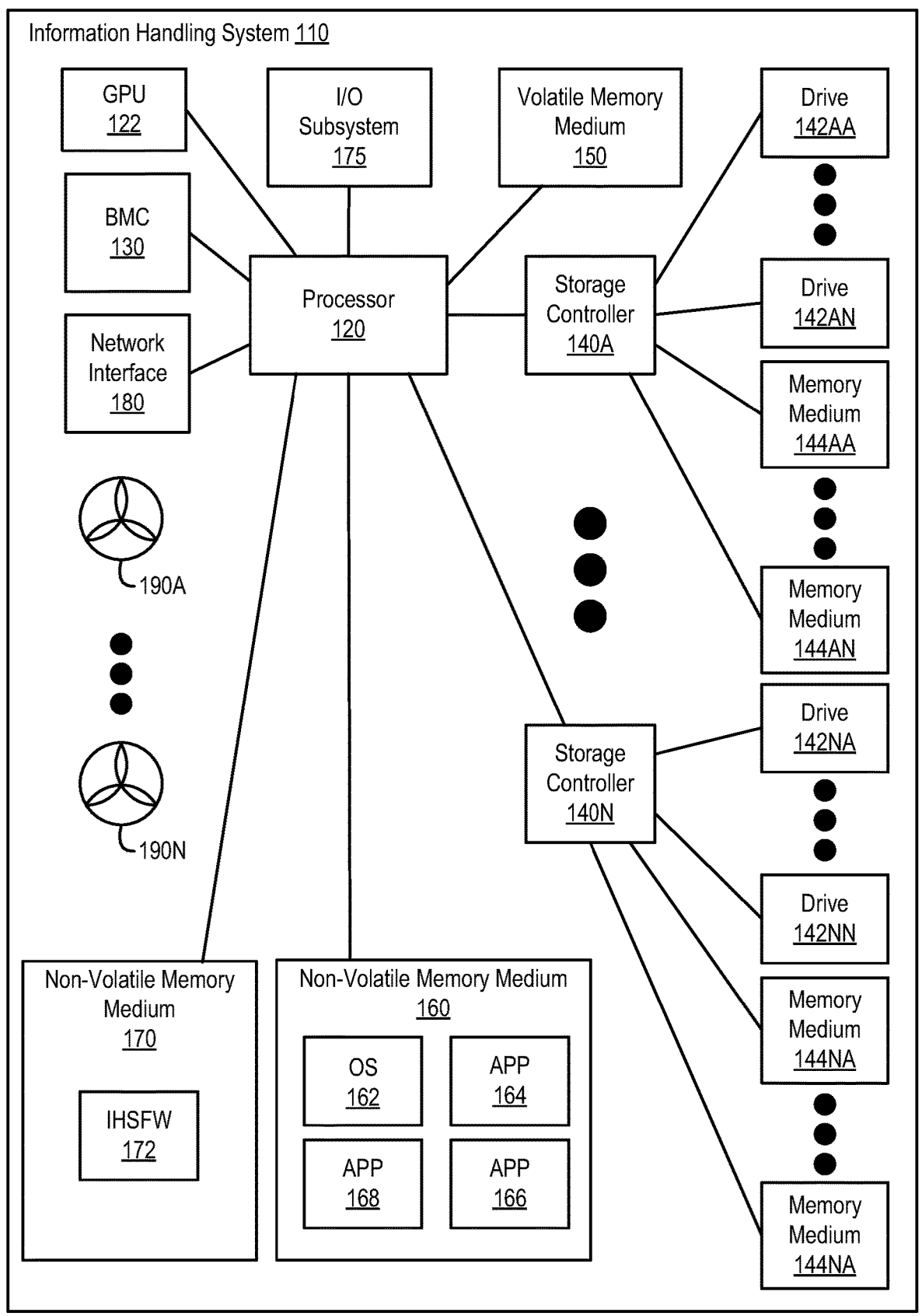
FIGS. 1A-1C illustrate examples of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a non-volatile memory medium may be sensitive to external acoustic and/or external mechanical vibrations. For example, a hard disk drive (HDD) may be sensitive to external acoustic and/or external mechanical vibrations. For instance, the external acoustic and/or external mechanical vibrations may cause one or more performance losses of the HDD. As an example, one or more air moving devices (e.g., fans) and/or one or more thermal management systems (e.g., pumps, pipes, etc.) of an information handling system may cause the external acoustic and/or external mechanical vibrations.

In one or more embodiments, an information handling system may be configured to minimize the external acoustic and/or external mechanical vibrations from the one or more air moving devices and/or the one or more thermal management systems. For example, one or more upper thresholds may be applied to the one or more air moving devices and/or the one or more thermal management systems. For instance, when the one or more upper thresholds are applied to the one or more air moving devices and/or the one or more thermal management systems, the information handling system may not operate at peak capacity. As an example, an information processing capability of the information handling system may be less than a full potential when the one or more upper thresholds are applied to the one or more air moving devices and/or the one or more thermal management systems. For instance, a clock speed of a processor of the information handling system may be reduced to reduce activity of the one or more air moving devices and/or the one or more thermal management systems. In one or more embodiments, curtailing the information processing capability of the information handling system may be too restrictive for one or more information processing applications.

In one or more embodiments, a real-time offloading process and/or method may be utilized when the external acoustic and/or external mechanical vibrations reach a threshold. For example, the real-time offloading process and/or method may redirect data writes to one or more hard disk drives (HDDs) to one or more solid state memory media. For instance, the one or more solid state memory media may not be impacted by the external acoustic and/or external mechanical vibrations. In one or more embodiments, the one or more solid state memory media may include one or more solid state drives (SSDs). For example, a solid state drive (SSD) may not be impacted by the external acoustic and/or external mechanical vibrations. In one or more embodiments, the real-time offloading process and/or method may store data, originally destined for the one or more HDDs, via the one or more solid state memory media and store the data via the HDDs when the external acoustic and/or external mechanical vibrations falls below the threshold. For example, the real-time offloading process and/or method may cache data, originally destined for the one or more HDDs, via the one or more solid state memory media when the external acoustic and/or external mechanical vibrations reach the threshold. For instance, the real-time offloading process and/or method may transfer the data, originally destined for the one or more HDDs, from the one or more memory media to the one or more HDDs when the external acoustic and/or external mechanical vibrations fall below the threshold. In one or more embodiments, data originally destined for the one or more HDDs may be stored via the one or more HDDs when the external acoustic and/or external mechanical vibrations are below the threshold.

Figure 1B:
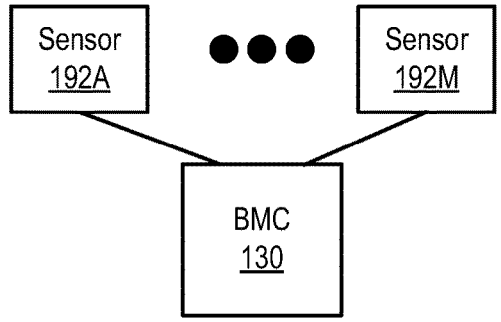
Figure 1C:
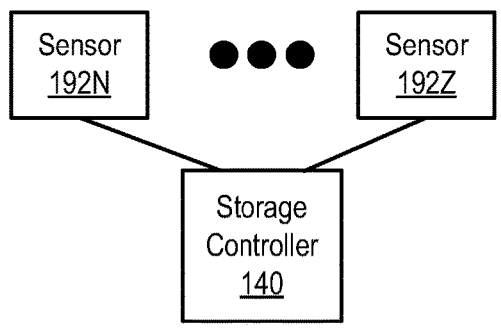

Turning now to FIGS. 1A-1C, examples of an information handling system are illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I2C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

In one or more embodiments, IHS 110 may include a processor 120, a graphics processing unit (GPU) 122, a baseboard management controller (BMC) 130, hardware storage controllers 140A-140N, a volatile memory medium 150, non-volatile memory media 160 and 170, an I/O subsystem 175, and a network interface 180. For example, GPU 122, BMC 130, hardware storage controllers 140A-140N, volatile memory medium 150, non-volatile memory media 160 and 170, I/O subsystem 175, and network interface 180 may be communicatively coupled to processor 120. In one or more embodiments, one or more of GPU 122, BMC 130, hardware storage controllers 140A-140N, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of GPU 122, BMC 130, hardware storage controllers 140A-140N, volatile memory medium 150, non-volatile memory media 160 and 170, I/O subsystem 175, and network interface 180 may be communicatively coupled to processor 120 via one or more PCI-Express (PCIe) root complexes. In another example, one or more of BMC 130, I/O subsystem

175 and network interface 180 may be communicatively coupled to processor 120 via one or more PCIe switches. Although not specifically illustrated, a storage controller 140 may be communicatively coupled to BMC 130, according to one or more embodiments.

In one or more embodiments, an information handling system may include one or more storage controllers. For example, IHS 110 may include hardware storage controllers 140A-140N. For instance, storage controllers 140A-140N may be communicatively coupled to processor 120 of IHS 110. As an example, storage controllers 140A-140N may be communicatively coupled to a root complex (not specifically illustrated) of IHS 110. In one or more embodiments, one or more of GPU 122, BMC 130, storage controllers 140A-140N, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of GPU 122, BMC 130, storage controllers 140A-140N, volatile memory medium 150, non-volatile memory media 160 and 170, I/O subsystem 175, and network interface 180 may be communicatively coupled to processor 120 via one or more PCIe root complexes. In another example, one or more of BMC 130, I/O subsystem 175, and network interface 180, among others, may be communicatively coupled to processor 120 via one or more PCIe switches.

In one or more embodiments, an information handling system may include drives of a data storage system. In one example, IHS 110 may include drives 142AA-142AN of a first data storage system. For instance, the first data storage system may include storage controller 140A and drives 142AA-142AN, among others. In one or more embodiments, drives 142AA-142AN may be communicatively coupled to storage controller 140A. Although drives 142AA-142AN are illustrated, the first storage system may include any number of drives 142, according to one or more embodiments. In another example, IHS 110 may include drives 142NA-142NN of a second data storage system. For instance, the second data storage system may include storage controller 140N and drives 142NA-142NN, among others. In one or more embodiments, drives 142NA-142NN may be communicatively coupled to storage controller 140N. Although drives 142NA-142NN are illustrated, the second data storage system may include any number of drives 142, according to one or more embodiments.

In one or more embodiments, an information handling system may include one or more solid state memory media. For example, IHS 110 may include solid state memory media 144AA-144NN, among others. In one instance, solid state memory media 144AA-144AN may be communicatively coupled to storage controller 140A. In another instance, solid state memory media 144NA-144NN may be communicatively coupled to storage controller 140N. In one or more embodiments, the first data storage system may include one or more solid state memory media. For example, the first data storage system may include solid state memory media 144AA-144AN, among others. In one or more embodiments, the second data storage system may include one or more solid state memory media. For example, the second data storage system may include solid state memory media 144NA-144NN, among others.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a SSD, or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, a memory medium 144 may include at least one solid state memory medium. For example, a memory medium 144 may include one or more of a volatile memory medium and a non-volatile memory medium. For instance, a memory medium 144 may include one or more of RAM, DRAM, EDO RAM, SRAM, NVRAM (non-volatile RAM), ferroelectric RAM (FRAM), flash memory, and a SSD, among others.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, a storage controller may be or include a hardware device that may manage the physical disk drives. For example, the storage controller may present the physical disk drives to one or more of a processor, an operating system, and an application, among others, as one or more logical units. In one instance, the one or more logical units may respectively include one or more drives. In a second instance, the one or more logical units may respectively include one or more (disk) volumes. In another instance, the one or more logical units may respectively include one or more (disk) images. In one or more embodiments, a storage controller may be or may include a disk array controller. For example, the storage controller may control and/or manage an array of disks. In one instance, storage controller 140A may control and/or manage array of disks 142AA-142AN. In another instance, storage controller 140N may control and/or manage array of disks 142NA-142NN. In one or more embodiments, the storage controller may implement a hardware RAID (redundant array of independent disks) controller. For example, a hardware RAID controller may be or may include a PowerEdge Raid Controller (PERC).

In one or more embodiments, a hardware RAID controller may be classified based at least on one or more of a supported RAID level, a number of internal or external drive ports, a drive type, a number of drives the hardware RAID controller can support, a front-end interface, a back-end interface, and a cache volatile memory medium, among others. In one example, a front-end interface of a hardware RAID controller may enable communication with an information handling system host adapter. For instance, the front-end interface of a hardware RAID controller may provide a logical drive to a processor and/or operating system of an information handling system. In another example, a back-end interface of a hardware RAID controller may communicate and/or manage underlying drives.

In one or more embodiments, a hardware RAID controller may implement a RAID level. For example, a hardware RAID controller may implement a RAID level that is compliant with a Common RAID Disk Data Format Specification (available from the Storage Networking Industry Association). For instance, a hardware RAID controller may implement one or more of a RAID level 0 (e.g., striping), RAID level 1 (e.g., mirroring), RAID level 5 (e.g., distributed parity), and RAID 6 (e.g., dual parity), among others. In one or more embodiments, multiple RAID levels may be combined or nested. For example, multiple RAID levels that may be combined or nested may include RAID level 10 (e.g., striping of mirrors) or RAID level 01 (e.g., mirroring stripe sets).

In one or more embodiments, a storage controller may integrate one or more memory areas in multiple memory devices. For example, the storage controller may provide the one or more memory areas in multiple memory devices as a single memory area to one or more of a processor, an operating system, and an application, among others. In one instance, storage controller 140A may integrate drives 142AA-142AN. As an example, storage controller 140A may provide drives 142AA-142AN as a single drive to one or more of processor 120, OS 162, and APPs 164-168, among others. In another instance, storage controller 140N may integrate drives 142NA-142NN. As an example, storage controller 140N may provide drives 142NA-142NN as a single drive to one or more of processor 120, OS 162, and APPs 164-168, among others.

In one or more embodiments, a storage controller may receive data to store. For example, the storage controller may determine a memory device from multiple memory devices to store the data. In one instance, storage controller 140A may receive data to store. As an example, storage controller 140A may determine a drive 142 of drives 142AA-142AN to store the data. In another instance, storage controller 140N may receive data to store. As an example, storage controller 140A may determine a drive 142 of drives 142NA-142NN to store the data.

In one or more embodiments, a storage controller may receive a request for data. For example, the storage controller may determine which memory device stores the data and may retrieve the data from the memory device. For instance, the storage controller may provide the data to one or more of a processor, an operating system, and an application, among others. In one or more embodiments, storage controller 140A may receive a request for data. For example, storage controller 140A may determine which drive 142 of drives 142AA-142AN stores the data and may retrieve the data from that drive. For instance, storage controller 140A may provide the data to one or more of processor 120, OS 162, and APPs 164-168, among others. In one or more embodiments, storage controller 140N may receive a request for data. For example, storage controller 140N may determine which drive 142 of drives 142NA-142NN stores the data and may retrieve the data from that drive. For instance, storage controller 140N may provide the data to one or more of processor 120, OS 162, and APPs 164-168, among others.

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

In one or more embodiments, an information handling system may include one or more fans. For example, IHS 110 may include fans 190A-190N. Although IHS 110 is illustrated as including fans 190A-190N, IHS 110 may include any number of fans 190, according to one or more embodiments. In one or more embodiments, a fan 190 may move air. In one example, a fan 190 may move air within IHS 110. In a second example, a fan 190 may move air into IHS 110, may intake air into IHS 110, and/or may bring air into IHS 110. In another example, a fan 190 may move air out of IHS 110, may remove air from IHS 110, and/or may expel air from IHS 110. In one or more embodiments, BMC 130 may control one or more of fans 190A-190C. For example, BMC 130 may provide control information to a fan controller (not specifically illustrated), which may control one or more of fans 190A-190C. For instance, BMC 130 may provide control information to the fan controller via a SMBus. In one or more embodiments, a fan 190 may generate one or more sounds and/or one or more vibrations as fan 190 operates to move air. In one or more embodiments, the one or more sounds the fan 190 generates may be quantified as one or more sound pressure levels.

In one or more embodiments, a HDD (e.g., a hard disk, a hard drive, etc.) may be or include an electro-mechanical data storage device. For example, the HDD may store and may retrieve digital data using magnetic storage via one or more rigid rotating platters, which may be coated with magnetic material. For instance, the platters may be associated with one or more magnetic heads, which may be arranged on a movable actuator arm. As an example, the one or more magnetic heads may read data from and write data to the platter surfaces. In one or more embodiments, data may be accessed in a random-access manner, which may include accessing individual blocks of data that may be stored and retrieved in any order. In one or more embodiments, a HDD may be a type of a non-volatile memory medium, which can retain stored data even when powered off and/or when power is removed from the HDD.

In one or more embodiments, a SSD may be or may include a solid state storage device, which may utilize one or more integrated circuits to store data persistently. In one example, a SSD may utilize flash memory to persistently store data. In another example, a SSD may utilize FRAM to persistently store data. In one or more embodiments, a SSD may store data in semiconductor cells. For example, a semiconductor cell may store one to four 4 bits of data, among others. In one or more embodiments, a SSD may not include any moving parts and/or may not include any movable parts to store data and/or to retrieve stored data. For example, a SSD may not include and/or may not utilize physical spinning disks and/or movable read/write heads utilized in HDDs and/or floppy disk drives. For instance, compared with electromechanical drives (e.g., HDDs), SSDs may be more resistant to physical shock, may be more resistant to physical vibrations, and/or may operate silently. In one or more embodiments, a SSD may utilize a HDD interface and/or a HDD form factor. For example, a SSD may be utilized as a drop-in replacement for a HDD. In one or more embodiments, a SSD may utilize an interface that may not be associated with a HDD. In one or more embodiments, a SSD may be a type of a non-volatile memory medium, which can retain stored data even when powered off and/or when power is removed from the SSD.

In one or more embodiments, an information handling system may include one or more sensors. For example, IHS 110 may include sensors 192A-192A, as shown in FIGS. 1B and 1C. Although IHS 110 is shown with sensors 192A-192Z, IHS 110 may include any number of sensors 192, according to one or more embodiments. For example, IHS 110 may include any number of sensors 192 at any number of respective physical locations within IHS 110. In one instance, any number of sensors 192 may be at any number of respective physical locations on a motherboard of IHS 110. In another instance, any number of sensors 192 may be at any number of respective physical locations on a backplane of IHS 110. In one or more embodiments, sensors 192A-192M may be communicatively coupled to BMC 130, as illustrated in FIG. 1B. For example, BMC 130 may receive information from sensors 192A-192M. For instance, sensors 192A-192M may provide information to BMC 130. Although FIG. 1B shows sensors 192A-192M, communicatively coupled to BMC 130, any number of sensors 192 may be communicatively coupled to BMC 130, according to one or more embodiments. In one or more embodiments, sensors 192M-192Z may be communicatively coupled to a storage controller 140, as illustrated in FIG. 1C. For example, storage controller 140 may receive information from sensors 192M-192Z. For instance, sensors 192M-192Z may provide information to storage controller 140. Although FIG. 1C shows sensors 192A-192M, communicatively coupled to storage controller 140, any number of sensors 192 may be communicatively coupled to storage controller 140, according to one or more embodiments.

In one or more embodiments, a sensor 192 may transform one or more physical phenomena into one or more signals. In one example, a sensor 192 may transform one or more physical phenomena into one or more analog signals and may provide the one or more analog signals to BMC 130. For instance, BMC 130 may receive the one or more analog signals. As an example, the one or more analog signals may convey one or more values associated with the one or more physical phenomena. In a second example, a sensor 192 may transform one or more physical phenomena into one or more digital signals and may provide the one or more digital signals to BMC 130. For instance, BMC 130 may receive the one or more digital signals. As an example, the one or more digital signals may convey one or more values associated with the one or more physical phenomena. In a third example, a sensor 192 may transform one or more physical phenomena into one or more analog signals and may provide the one or more analog signals to storage controller 140. For instance, storage controller 140 may receive the one or more analog signals. As an example, the one or more analog signals may convey one or more values associated with the one or more physical phenomena. In another example, a sensor 192 may transform one or more physical phenomena into one or more digital signals and may provide the one or more digital signals to storage controller 140. For instance, storage controller 140 may receive the one or more digital signals. As an example, the one or more digital signals may convey one or more values associated with the one or more physical phenomena. In one or more embodiments, a sensor 192 may provide temperature values to EC 130 via the one or more signals.

In one or more embodiments, an analog to digital converter (ADC) may transform one or more analog signals into one or more digital data. For example, an ADC may transform one or more analog signals into one or more digital signals. In one or more embodiments, an ADC may provide the one or more digital data and/or the one or more digital signals to BMC 130 and/or a storage controller 140, among others. For example, IHS 110 may include one or more analog to digital converters (ADCs). In one or more embodiments, BMC 130 and/or a storage controller 140, among others, may include one or more ADCs.

Figure 2:
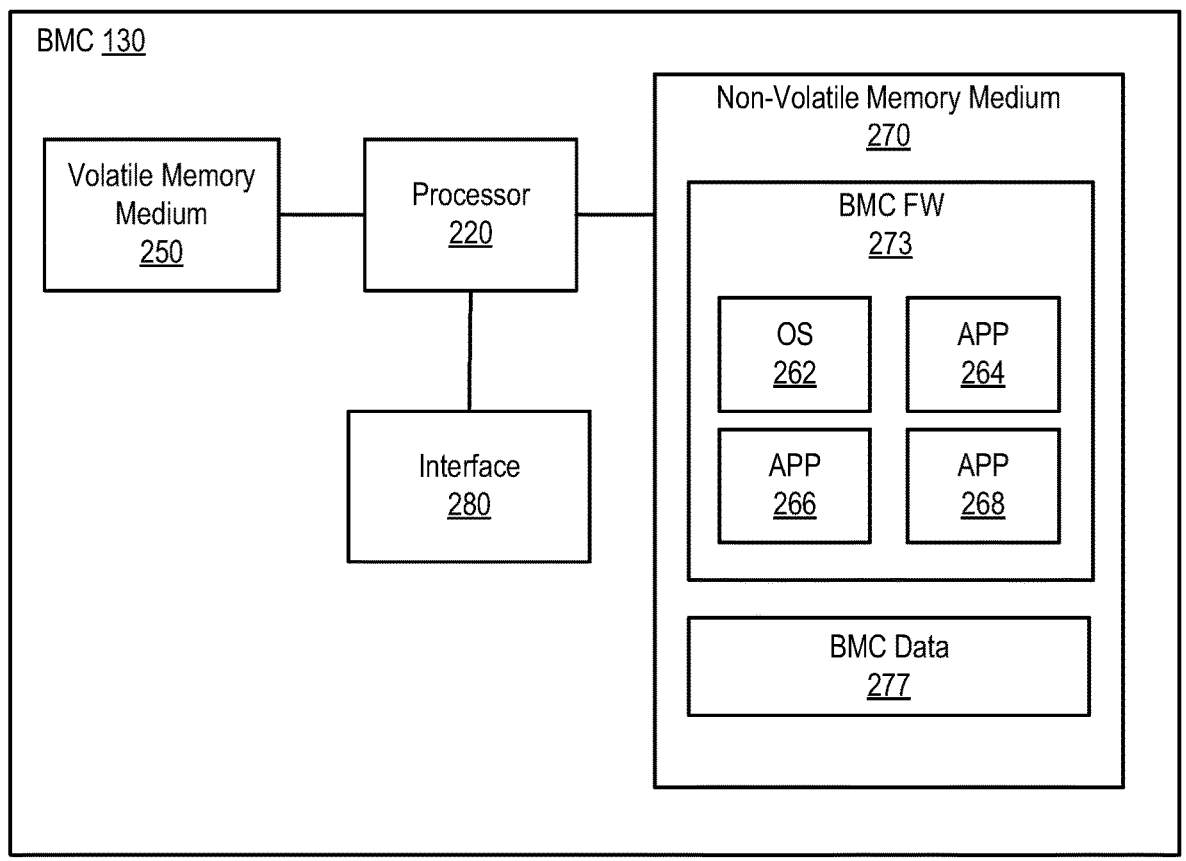
FIG. 2 illustrates an example of a baseboard management controller, according to one or more embodiments.

Turning now to FIG. 2, an example of a baseboard management controller is illustrated, according to one or more embodiments. As shown, BMC 130 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In a second instance, interface 280 may include GPIO circuitry that may enable BMC 130 to provide and/or receive signals associated with other circuitry. In another instance, interface 280 may include GPIO circuitry that may enable BMC 130 to receive signals from a sensor 192. In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3A:
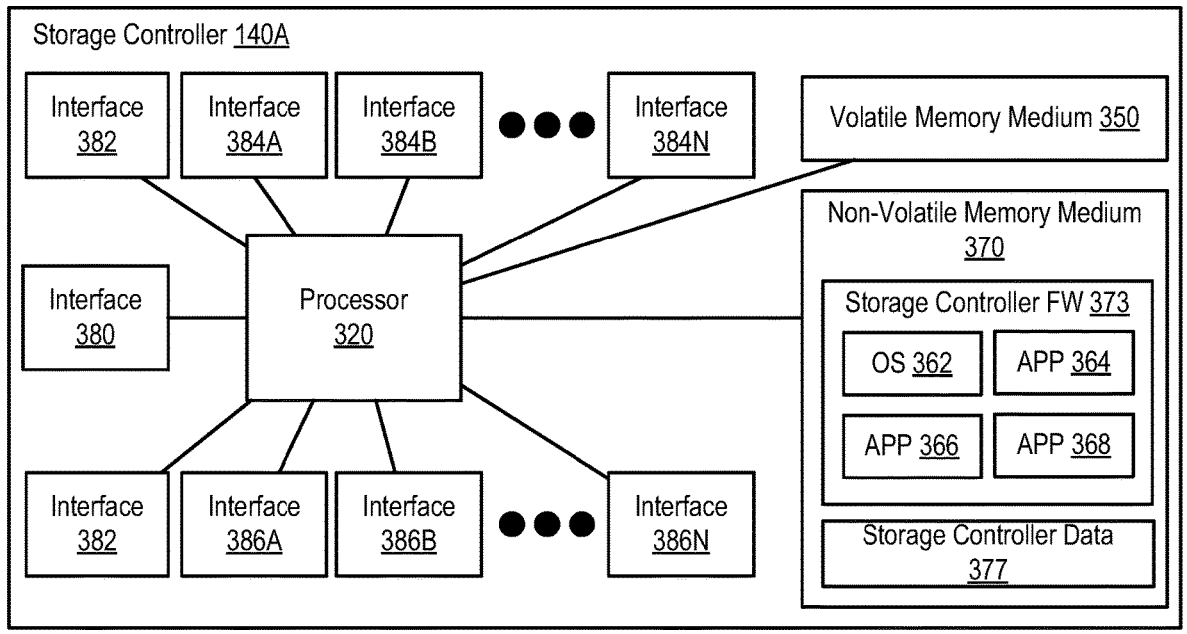
FIG. 3A illustrates an example of a storage controller, according to one or more embodiments.

Turning now to FIG. 3A, an example of a storage controller is illustrated, according to one or more embodiments. As shown, a storage controller 140A may include a processor 320, a volatile memory medium 350, a non-volatile memory medium 370, and an interface 380. As illustrated, non-volatile memory medium 370 may include a storage controller FW 373, which may include an OS 362 and APPs 364-368, and may include storage controller data 377. In one example, OS 362 may be or include a RTOS. For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 362 may be or include an Unix-like operating system. For instance, the Unix-like operating system may be or include LINUX®, FREEBSD®, NETBSD®, OpenBSD, Minix, Xinu, or Darwin, among others. In another example, OS 362 may be or include a POSIX compliant operating system.

In one or more embodiments, interface 380 may include circuitry that enables communicatively coupling to one or more devices. In one example, interface 380 may include circuitry that enables communicatively coupling to one or more buses. For instance, the one or more buses may include one or more buses described herein, among others. In a second example, interface 380 may include circuitry that enables one or more interrupt signals to be received. In one instance, interface 380 may include GPIO circuitry, and the GPIO circuitry may enable one or more interrupt signals to be received and/or provided via at least one interrupt line. In a second instance, interface 380 may include GPIO circuitry that may enable storage controller 140A to provide and/or receive signals associated with other circuitry. In another instance, interface 280 may include GPIO circuitry that may enable storage controller 140A to receive signals from a sensor 192. In another example, interface 380 may include circuitry that enables communicatively coupling to one or more networks.

In one or more embodiments, one or more of OS 362 and APPs 364-368 may include processor instructions executable by processor 320. In one example, processor 320 may execute processor instructions of one or more of OS 362 and APPs 364-368 via non-volatile memory medium 370. In another example, one or more portions of the processor instructions of the one or more of OS 362 and APPs 364-368 may be transferred to volatile memory medium 350, and processor 320 may execute the one or more portions of the processor instructions of the one or more of OS 362 and APPs 364-368 via volatile memory medium 350. In one or more embodiments, processor 320 may execute instructions in accordance with at least a portion of one or more systems, at least a portion of one or more flowcharts, one or more methods, and/or at least a portion of one or more processes described herein. For example, non-volatile memory medium 370 and/or volatile memory medium 350 may store instructions that may be executable in accordance with at least a portion of one or more systems, at least a portion of one or more flowcharts, at least a portion of one or more methods, and/or at least a portion of one or more processes described herein. In one or more embodiments, processor 320 may execute instructions in accordance with at least a portion of one or more of systems, flowcharts, at least a portion of one or more methods, and/or at least a portion of one or more processes described herein. For example, non-volatile memory medium 370 and/or volatile memory medium 350 may store instructions that may be executable in accordance with at least a portion of one or more of systems, at least a portion of one or more flowcharts, at least a portion of one or more methods, and/or at least a portion of one or more processes described herein. In one or more embodiments, processor 320 may utilize storage controller data 377. In one example, processor 320 may utilize storage controller data 377 via non-volatile memory medium 370. In another example, one or more portions of storage controller data 377 may be transferred to volatile memory medium 350, and processor 320 may utilize storage controller data 377 via volatile memory medium 350.

In one or more embodiments, a storage controller 140 may include an interface 382. In one example, interface 382 may be compliant with a PCIe specification. For instance, interface 382 may be communicatively coupled to a PCIe interface of IHS 110. In another example, interface 382 may be compliant with one or more of a SATA specification, a SAS specification, a SCSI specification, a Thunderbolt specification, and a USB specification, among others. In one or more embodiments, storage controller 140 may be communicatively coupled to processor 120 via interface 382. For example, storage controller 140 may communicate with one or more of processor 120, OS 162, and APPs 164-168, among others, via interface 382.

In one or more embodiments, a storage controller 140 may include interfaces 384A-384N. For example, an interface 384 may be configured to be communicatively coupled to a drive 142. For instance, an interface 384 may be compliant with one or more of a SATA specification, a SAS specification, a SCSI specification, a Thunderbolt specification, and a USB specification, among others. Although interfaces 384A-384N, a storage controller 140 may include any number of interfaces 384, according to one or more embodiments. In one or more embodiments, a storage controller 140 may include one or more structures and/or one or more functionalities of those described with reference to storage controller 140A.

In one or more embodiments, a storage controller 140 may include interfaces 386A-386N. For example, an interface 386 may be configured to be communicatively coupled to a memory medium 144. For instance, an interface 386 may be compliant with one or more of a PCIe specification, a SATA specification, a SAS specification, a SCSI specification, a Thunderbolt specification, and a USB specification, among others. Although interfaces 386A-386N, a storage controller 140 may include any number of interfaces 386, according to one or more embodiments. In one or more embodiments, a storage controller 140 may include one or more structures and/or one or more functionalities of those described with reference to storage controller 140A.

Figure 3B:
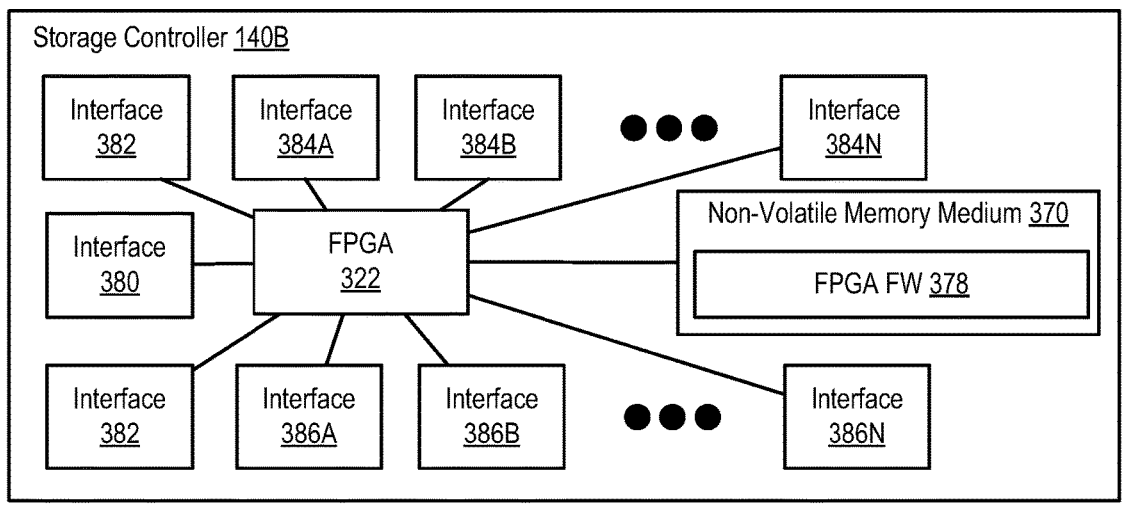
FIG. 3B illustrates another example of a storage controller, according to one or more embodiments.

Turning now to FIG. 3B, another example of a storage controller is illustrated, according to one or more embodiments. As shown, a storage controller 140B may include a FPGA 322, a non-volatile memory medium 370, and an interface 380. As illustrated, non-volatile memory medium 370 may include a storage controller FW 378. Although not specifically illustrated, FPGA 322 may include one or more of non-volatile memory medium 370 and storage controller FW 378, according to one or more embodiments.

In one or more embodiments, interface 380 may include circuitry that enables communicatively coupling to one or more devices. In one example, interface 380 may include circuitry that enables communicatively coupling to one or more buses. For instance, the one or more buses may include one or more buses described herein, among others. In a second example, interface 380 may include circuitry that enables one or more interrupt signals to be received. In one instance, interface 380 may include GPIO circuitry, and the GPIO circuitry may enable one or more interrupt signals to be received and/or provided via at least one interrupt line. In a second instance, interface 380 may include GPIO circuitry that may enable storage controller 140B to provide and/or receive signals associated with other circuitry. In another instance, interface 280 may include GPIO circuitry that may enable storage controller 140B to receive signals from a sensor 192. In another example, interface 380 may include circuitry that enables communicatively coupling to one or more networks.

In one or more embodiments, FPGA 322 may be configured in accordance with at least a portion of one or more systems, at least a portion of one or more flowcharts, one or more methods, and/or at least a portion of one or more processes described herein. For example, storage controller FW 378 may be configured in accordance with at least a portion of one or more systems, at least a portion of one or more flowcharts, one or more methods, and/or at least a portion of one or more processes described herein. For instance, storage controller FW 378 may configure FPGA 322 in accordance with at least a portion of one or more systems, at least a portion of one or more flowcharts, one or more methods, and/or at least a portion of one or more processes described herein.

In one or more embodiments, a storage controller 140 may include an interface 382. In one example, interface 382 may be compliant with a PCIe specification. For instance, interface 382 may be communicatively coupled to a PCIe interface of IHS 110. In another example, interface 382 may be compliant with one or more of a SATA specification, a SAS specification, a SCSI specification, a Thunderbolt specification, and a USB specification, among others. In one or more embodiments, storage controller 140 may be communicatively coupled to processor 120 via interface 382. For example, storage controller 140 may communicate with one or more of processor 120, OS 162, and APPs 164-168, among others, via interface 382.

In one or more embodiments, a storage controller 140 may include interfaces 384A-384N. For example, an interface 384 may be configured to be communicatively coupled to a drive 142. For instance, an interface 384 may be compliant with one or more of a SATA specification, a SAS specification, a SCSI specification, a Thunderbolt specification, and a USB specification, among others. Although interfaces 384A-384N, a storage controller 140 may include any number of interfaces 384. In one or more embodiments, a storage controller 140 may include one or more structures and/or one or more functionalities of those described with reference to storage controller 140B.

In one or more embodiments, a storage controller 140 may include interfaces 386A-386N. For example, an interface 386 may be configured to be communicatively coupled to a memory medium 144. For instance, an interface 386 may be compliant with one or more of a PCIe specification, a SATA specification, a SAS specification, a SCSI specification, a Thunderbolt specification, and a USB specification, among others. Although interfaces 386A-386N, a storage controller 140 may include any number of interfaces 386, according to one or more embodiments. In one or more embodiments, a storage controller 140 may include one or more structures and/or one or more functionalities of those described with reference to storage controller 140A.

Although FIG. 3B shows a storage controller 140 that includes FPGA 322, a storage controller 140 may include an ASIC, according to one or more embodiments. For example, an ASIC may be substituted for FPGA 322. For instance, the ASIC may be configured in accordance with at least a portion of one or more systems, at least a portion of one or more flowcharts, one or more methods, and/or at least a portion of one or more processes described herein.

Figure 4A:
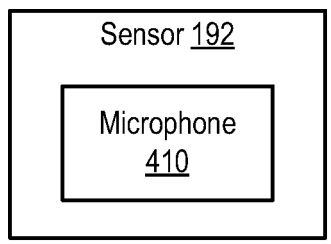
FIGS. 4A-4E illustrate examples of sensors, according to one or more embodiments.

Turning now to FIGS. 4A-4E, examples of sensors are illustrated, according to one or more embodiments. In one or more embodiments, a sensor 192 may include a microphone 410, as shown in FIG. 4A. For example, microphone 410 may transform air pressure variations of sound waves to electrical signals. In one or more embodiments, sensor 192 may include an amplifier (which is not specifically illustrated) coupled to microphone 410. For example, the amplifier may amplify the electrical signals produced by microphone 410. For instance, sensor 192 may provide signals from microphone 410 via the amplifier. In one or more embodiments, one or more vibrations associated with IHS 110 and/or one or more vibrations of one or more components of IHS 110 may be associated with air pressure variations of sound waves. For example, one or more values of vibrations may be associated with the air pressure variations of sound waves. For instance, the one or more values of vibrations may be associated with the electrical signals produced by microphone 410. In one or more embodiments, one or more sound pressure levels may be determined utilizing microphone 410. For example, a sound pressure level (SPL) may be a pressure level of a sound, which may be measured in decibels (dB).

Figure 4B:
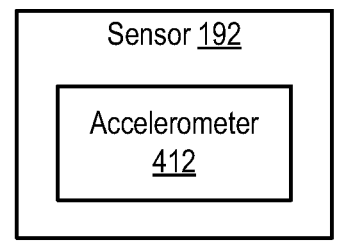

In one or more embodiments, a sensor 192 may include an accelerometer 412, as illustrated in FIG. 4B. For example, accelerometer 412 may be or include a device that determines values of proper acceleration. For instance, proper acceleration may be an acceleration (i.e., a rate of change of velocity) of a body in its own instantaneous rest frame, which may be different from coordinate acceleration, which may be acceleration in a fixed coordinate system. In one or more embodiments, accelerometer 412 may produce one or more values that may be associated with one or more vibrations associated with IHS 110 and/or one or more vibrations of one or more components of IHS 110.

Figure 4C:
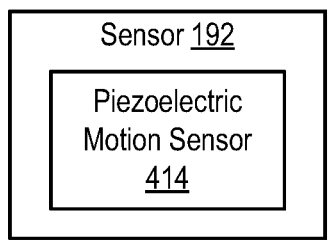

In one or more embodiments, a sensor 192 may include a piezoelectric motion sensor 414, as shown in FIG. 4C. For example, piezoelectric motion sensor 414 may be or include a device that may utilize a piezoelectric effect to measure changes in pressure, acceleration, temperature, strain, and/or force by converting those physical phenomena to electrical signals. For instance, piezoelectric motion sensor 414 may produce one or more values that may be associated with one or more vibrations associated with IHS 110 and/or one or more vibrations of one or more components of IHS 110. In one or more embodiments, piezoelectric motion sensor 414 may generate one or more voltage values based at least on a change in pressure, an acceleration, a temperature, a strain, and/or a force.

Figure 4D:
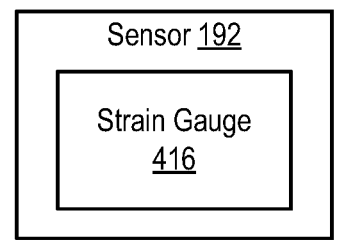

In one or more embodiments, a sensor 192 may include a strain gauge 416, as illustrated in FIG. 4D. For example, strain gauge 416 may a device utilized to measure strain on an object. For instance, strain gauge 416 may be attached to the object, and as the object is deformed, strain gauge 416 may be deformed, which may cause electrical resistance associated with strain gauge 416 to change. In one or more embodiments, strain gauge 416 may produce one or more values that may be associated with one or more vibrations associated with IHS 110 and/or one or more vibrations of one or more components of IHS 110. In one or more embodiments, one or more of a voltage, an electrical current, and a resistance value may be determined from strain gauge 416.

Figure 4E:
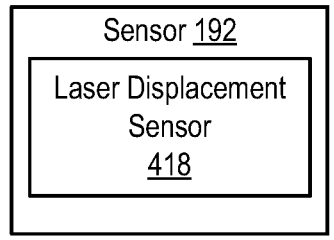

In one or more embodiments, a sensor 192 may include a laser displacement sensor 418, as shown in FIG. 4E. For example, laser displacement sensor 418 may implement non-contact measurement of a height, a position, and/or distance associated with an object and/or a target. For instance, laser displacement sensor 418 may generate a height value, a position value, and/or distance value associated with an object and/or a target. In one or more embodiments, laser displacement sensor 418 may produce one or more values that may be associated with one or more vibrations associated with IHS 110 and/or one or more vibrations of one or more components of IHS 110. For example, one or more vibrations associated with IHS 110 and/or one or more vibrations of one or more components of IHS 110 may cause differing height values, differing position values, and/or differing distance values associated with an object and/or a target.

Figure 5:
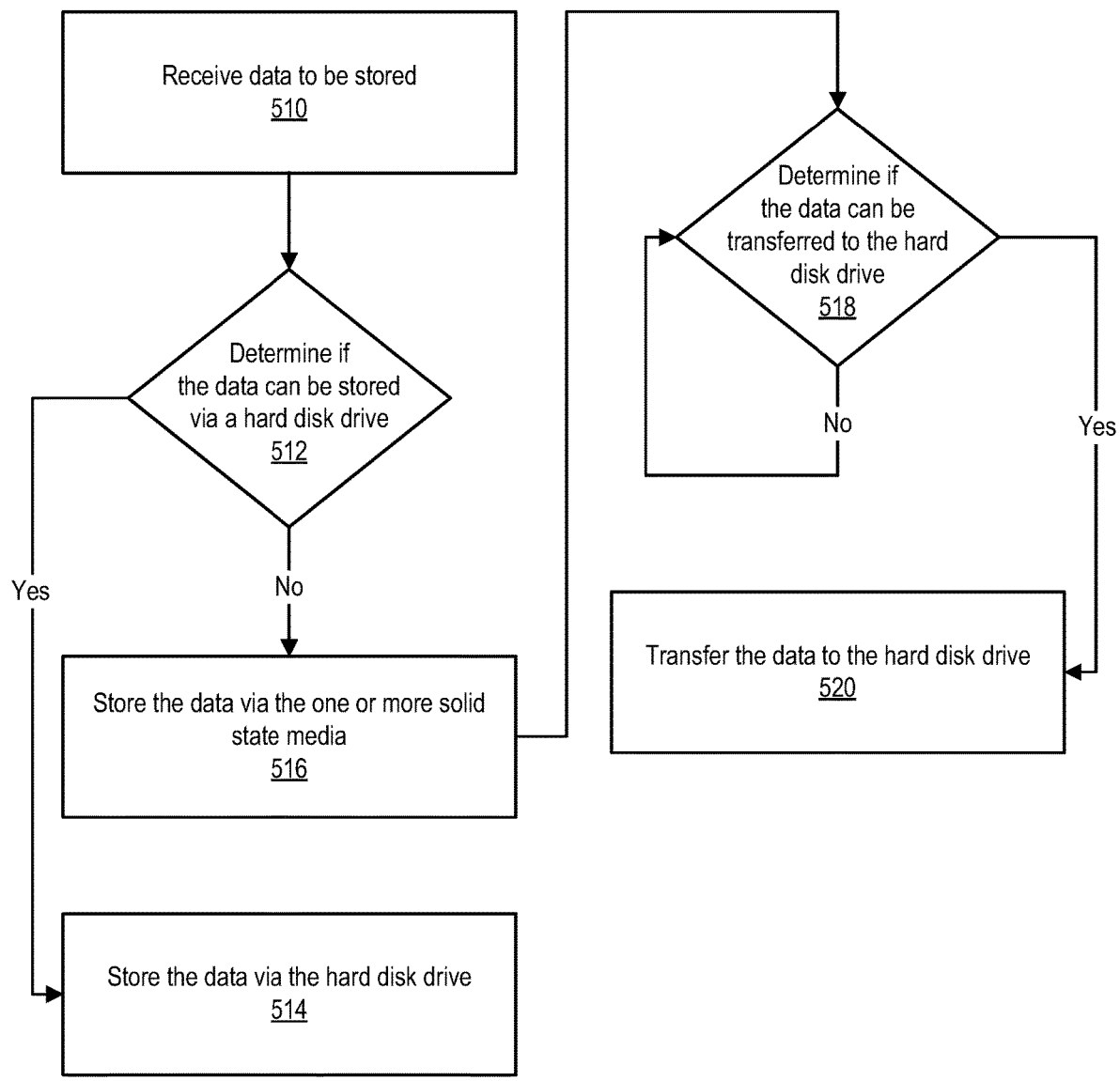
FIG. 5 illustrates an example of a method of storing data, according to one or more embodiments.

Turning now to FIG. 5, an example of a method of storing data is illustrated, according to one or more embodiments. At 510, data to store may be received. For example, storage controller 140A may receive data to be stored. At 512, it may be determined if the data can be stored via a hard disk drive. For example, storage controller 140A may determined if the data can be stored via a HDD of HDDs 142AA-142AN.

In one or more embodiments, determining if the data can be stored via the hard disk drive may include determining if a vibration value associated with one or more components of IHS 110 and/or IHS 110 is at or above a vibration threshold value. In one example, if the vibration value associated with one or more components of IHS 110 and/or IHS 110 is at or above the vibration threshold value, the data may not be stored via the hard disk drive. For instance, if the vibration value associated with one or more components of IHS 110 and/or IHS 110 is at or above the vibration threshold value, storage controller 140A may not store the data the HDD of HDDs 142AA-142AN. In another example, if the vibration value associated with one or more components of IHS 110 and/or IHS 110 is not at or above the vibration threshold value, the data may be stored via the hard disk drive. For instance, if the vibration value associated with one or more components of IHS 110 and/or IHS 110 is not at or above the vibration threshold value, storage controller 140A may store the data the HDD of HDDs 142AA-142AN. In one or more embodiments, IHS 110 may store a table of vibration threshold values. In one example, a vibration threshold value may be selected from the table of vibration threshold values based at least on power consumed or provided to processor 120. In a second example, a vibration threshold value may be selected from the table of vibration threshold values based at least on a percentage utilization of a fan 190 (e.g., an air mover). In another example, a vibration threshold value may be selected from the table of vibration threshold values based at least on a position error signal from the HDD of HDDs 142AA-142AN. For instance, the position error signal from the HDD of HDDs 142AA-142AN may provide a warning when a position error meets or exceeds a position error threshold associated with impacting read and/or write performance of the HDD of HDDs 142AA-142AN.

If the data can be stored via the hard disk drive, the data may be stored via the hard disk drive, at 514. For example, storage controller 140A may store the data via the HDD of HDDs 142AA-142AN. If the data cannot be stored via the hard disk drive, the data may be stored via one or more solid state memory media, at 516. For example, storage controller 140A may store the data via one or more of state memory media 144AA-144AN.

In one or more embodiments, determining if the data can be stored via the hard disk drive may include determining if a vibration value associated with one or more components of IHS 110 and/or IHS 110 is at or above a vibration threshold value. In one example, if the vibration value associated with one or more components of IHS 110 and/or IHS 110 is at or above the vibration threshold value, the data may not be stored via the hard disk drive. For instance, if the vibration value associated with one or more components of IHS 110 and/or IHS 110 is at or above the vibration threshold value, storage controller 140A may not store the data the HDD of HDDs 142AA-142AN. In another example, if the vibration value associated with one or more components of IHS 110 and/or IHS 110 is at or above the vibration threshold value, the data may be stored via one or more solid state memory media. For instance, if the vibration value associated with one or more components of IHS 110 and/or IHS 110 is at or above the vibration threshold value, storage controller 140A may store the data via one or more of solid state memory media 144AA-144AN.

At 518, it may be determined if the data can be transferred to the hard disk drive. For example, storage controller 140A may determine if the data can be transferred to the HDD of HDDs 142AA-142AN. In one or more embodiments, determining if the data can be transferred to the hard disk drive may include determining if another vibration value associated with one or more components of IHS 110 and/or IHS 110 is at or above the vibration threshold value. In one example, if the other vibration value associated with one or more components of IHS 110 and/or IHS 110 is at or above the vibration threshold value, the data cannot be transferred to the hard disk drive. In another example, if the other vibration value associated with one or more components of IHS 110 and/or IHS 110 is not at or above the vibration threshold value, the data can be transferred to the hard disk drive.

If the data cannot be transferred to the hard disk drive, the method may proceed to 518, according to one or more embodiments. If the data can be transferred to the hard disk drive, the data may be transferred to the hard disk drive. For example, the data may be transferred from the one or more solid state memory media to the hard disk drive. For instance, storage controller 140A may transfer the data to the HDD of HDDs 142AA-142AN. In one or more embodiments, transferring the data to the hard disk drive may include transferring the data from the one or more solid state memory media to the hard disk drive. For example, storage controller 140A may transfer the data from the one or more solid state memory media 144AA-144AN to the HDD of HDDs 142AA-142AN. For instance, storage controller 140A may copy the data from the one or more solid state memory media 144AA-144AN to the HDD of HDDs 142AA-142AN.

In one or more embodiments, transferring the data from the one or more solid state memory media to the hard disk drive may include retrieving the data from the one or more solid state memory media and storing the data via the hard disk drive. For example, storage controller 140A transferring the data from the one or more memory media 144AA-144AN to the HDD of HDDs 142AA-142AN may include storage controller 140A retrieving the data from the one or more memory media 144AA-144AN and storing the data via the HDD of HDDs 142AA-142AN.

In one or more embodiments, after transferring the data from the one or more solid state memory media to the hard disk drive, the data on the one or more solid state memory media may be overwritten. In one example, overwriting the data on the one or more solid state memory media may include writing information to one or more portions of the one or more solid state memory media that stored the data. For instance, overwriting the data on the one or more solid state memory media may be in accordance with one or more security measures and/or may permit one or more security measures to be implemented. In another example, overwriting the data on the one or more solid state memory media may include marking, tagging, flagging, and/or designating one or more portions of the one or more solid state memory media that stored the data such that the one or more solid state memory media that stored the data may store additional data. For instance, overwriting the data on the one or more solid state memory media may include marking, tagging, flagging, and/or designating one or more portions of the one or more solid state memory media that stored the data such that the one or more solid state memory media that stored the data may store additional data at a later time.

In one or more embodiments, determining if received data is to be stored via the hard disk drive or if the received data is to be stored to the one or more solid state memory media may include utilizing one or more proxies, which may permit indirect determination. For example, when an air mover speed (e.g., a fan 190) meets or exceeds a speed threshold value, storage controller 140A may store data via the one or more solid state memory media 144AA-144AN. For instance, dynamic disturbances associated with the air mover may have been previously characterized, which may be known to exceed above one or more speed threshold values. As an example, storage controller 140A may store data via the one or more solid state memory media 144AA-144AN when the air mover depicted exceeds sixty-five (65%) pulse width modulation (PWM). In one or more embodiments, thermal sensor data may be utilized to identify conditions that require an air mover speed response at or above a speed threshold value. For example, a required air mover speed response at or above the speed threshold value may occur when a utilization of processor 120 meets or exceeds 165 W for a supported ambient temperature value.

In one or more embodiments, determining if received data is to be stored via the hard disk drive or if the received data is to be stored to the one or more solid state memory media may be in accordance with Table 1. For example, when an air mover (e.g., a fan) is operated at ninety percent (90%) PWM, the air mover may support a thermal load up to 225 W of power of processor 120, but a dynamic disturbance (e.g., 7 dB above a threshold) of the air mover may overwhelm a read/write capability of the HDD of HDDs 142AA-142AN, which may cause throughput performance degradation of the hard disk drive. For instance, storage controller 140A may store data via the one or more solid state memory media 144AA-144AN until the thermal load up to 225 W of power of processor 120 has passed. As an example, this may permit utilization that is higher than current solutions that limits power of processor 120 to 165 W by limiting the air mover speed to sixty-five percent (65%) and meeting a dynamics threshold.

TABLE 1

| Air Mover Speed in Duty Cycle (percent PWM) | Processor Power Supported with air mover speed | HDD Dynamics Threshold Exceeded? | Apply Solution (i.e., write to one or more solid state memory media)? |
|---|---|---|---|
| 90% | 225 W | Yes (e.g., by 7 dB) | Yes |
| 65% | 165 W (i.e., about 70% of above) | Meets Threshold | No |

Figure 6A:
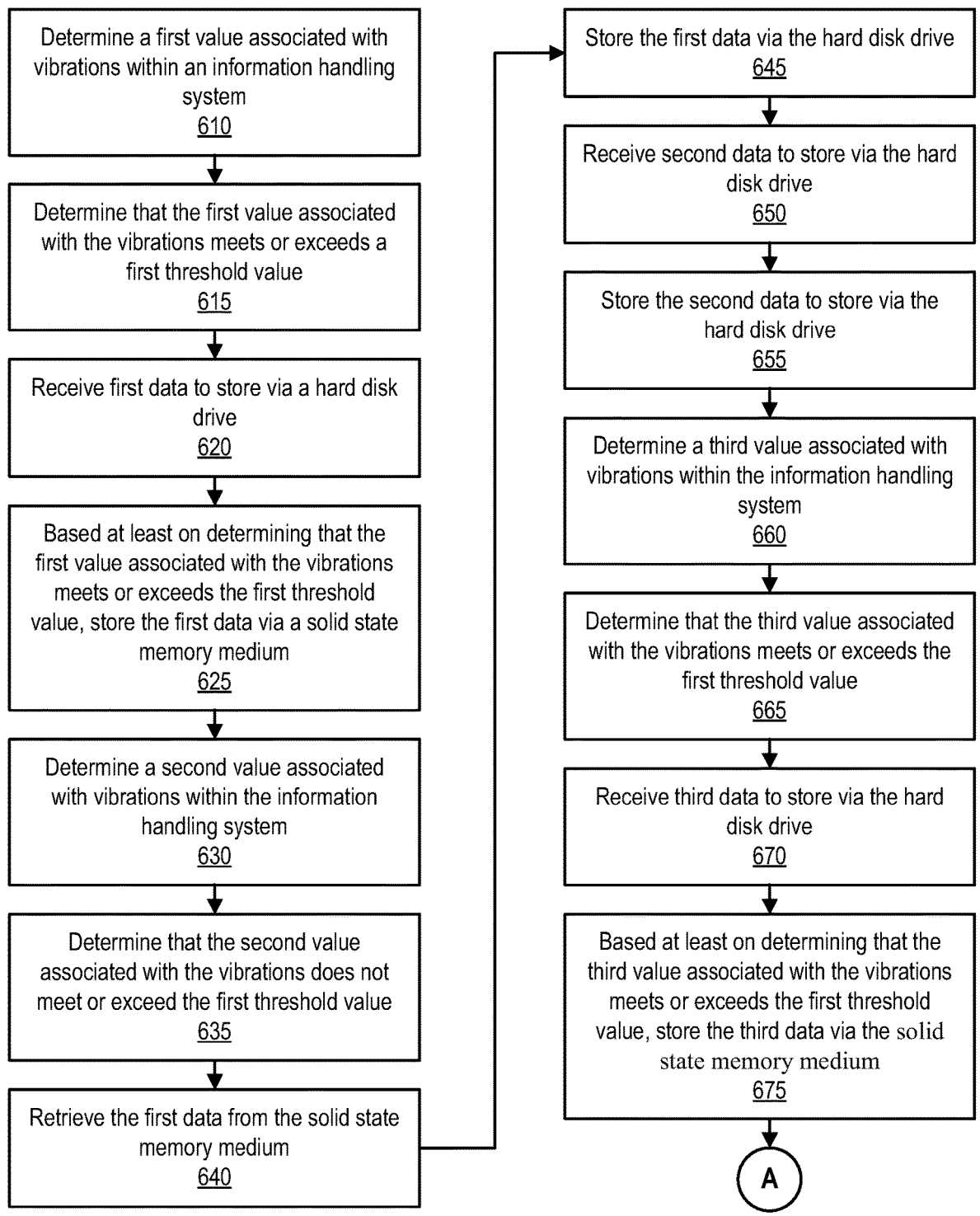
FIGS. 6A and 6B illustrates another example of a method of storing data, according to one or more embodiments.
Figure 6B:
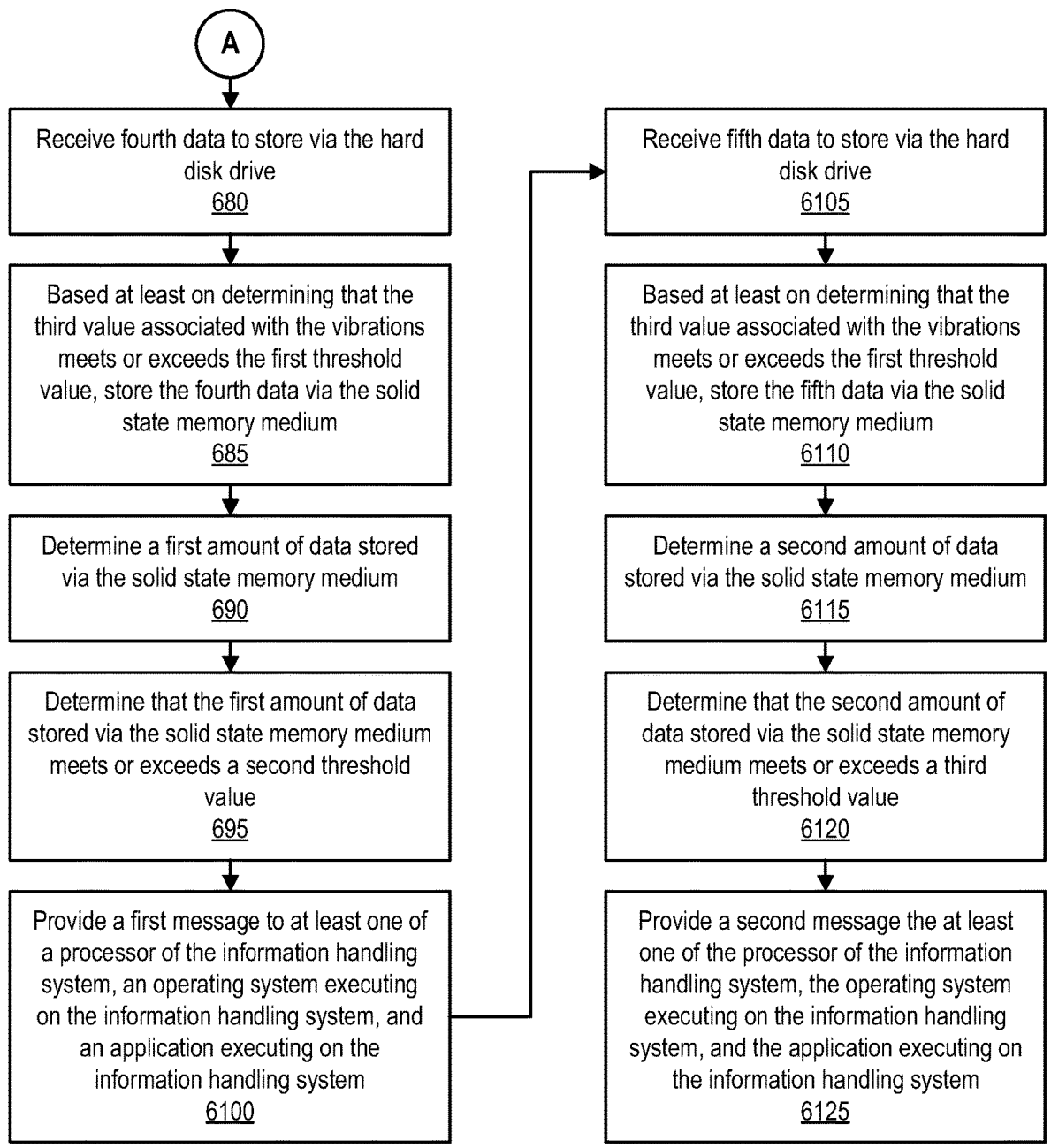

Turning now to FIGS. 6A and 6B, another example of a method of storing data is illustrated, according to one or more embodiments. At 610, a first value associated with vibrations within an information handling system may be determined. In one example, BMC 130 may determine a first value associated with vibrations within IHS 110. For instance, BMC 130 may utilize a sensor 192 to determine a first value associated with vibrations within IHS 110. In another example, storage controller 140A may determine a first value associated with vibrations within IHS 110. For instance, storage controller 140A may utilize a sensor 192 to determine a first value associated with vibrations within IHS 110.

In one or more embodiments, a value associated with vibrations within an information handling system may be or include a root mean square (RMS) value. In one example, a RMS value may be a value of square root of a mean square (e.g., an arithmetic mean of squares of a set of values). In another example, a RMS value may be based at least on a value for one or more continuously varying functions in terms of an integral of squares of instantaneous values during a cycle. In one or more embodiments, for a set of N values $v_k$, Value$_{RMS}$ (i.e., a RMS value) may determined via:

$$\text{Value}_{RMS} = \sqrt{\frac{1}{N}\sum_{k=1}^{N}(v_k)^2}.$$

For example, a sensor 192 may determine an amplitude or intensity value $v_k$ for each of N samples. For instance, the N samples may be determined at N different times. As one example, the N different times may be evenly distributed with respect to a period of time. For instance, an amount of time may be the same between every two values $v_k$ and $v_{k21}$. As another example, the N different times may not be evenly distributed with respect to the period of time. In one instance, an amount of time may not be the same between every two values $v_k$ and $v_{k21}$. In another instance, there may be a first amount of time between values $v_k$ and $v_{k21}$, and there may be a second amount of time, different from the first amount of time, between values $v_{k21}$ and $v_{k22}$.

At 615, it may be determined that the first value associated with the vibrations meets or exceeds a first threshold value. In one example, BMC 130 may determine that the first value associated with the vibrations meets or exceeds a first threshold value. In another example, storage controller 140A may determine that the first value associated with the vibrations meets or exceeds a first threshold value. At 620, first data may be received to store via a hard disk drive. For example, storage controller 140A may receive first data to store via a HDD of HDDs 142AA-142AN. For instance, storage controller 140A may receive the first data to store via the HDD of HDDs 142AA-142AN from one or more of processor 120, OS 162, and APPs 164-168, among others. In one or more embodiments, a hard disk drive may include one or more moving magnetic media. For example, the one or more moving magnetic media may include one or more rotating magnetic media. For instance, the one or more rotating magnetic media may include one or more rotating disk magnetic media. In one or more embodiments, a HDD 142 may include one or more moving magnetic media. For example, the one or more moving magnetic media may include one or more rotating magnetic media. For instance, the one or more rotating magnetic media may include one or more rotating disk magnetic media.

At 625, the first data may be stored via a solid state memory medium based at least on determining that the first value associated with the vibrations meets or exceeds the first threshold value. For example, storage controller 140A may store the first data via a solid state memory medium of solid state memory media 144AA-144AN based at least on determining that the first value associated with the vibrations meets or exceeds the first threshold value. For instance, storage controller 140A may store the first data via a solid state memory medium of solid state memory media 144AA-144AN in response to determining that the first value associated with the vibrations meets or exceeds the first threshold value.

At 630, a second value associated with vibrations within the information handling system may be determined. In one example, BMC 130 may determine a second value associated with vibrations within IHS 110. For instance, BMC 130 may utilize a sensor 192 to determine a second value associated with vibrations within IHS 110. In another example, storage controller 140A may determine a second value associated with vibrations within IHS 110. For instance, storage controller 140A may utilize a sensor 192 to determine a second value associated with vibrations within IHS 110.

At 635, it may be determined that the second value associated with the vibrations does not meet or exceed the first threshold value. In one example, BMC 130 may determine that the second value associated with the vibrations does not meet or exceed the first threshold value. In another example, storage controller 140A may determine that the second value associated with the vibrations does not meet or exceed the first threshold value. If the second value associated with the vibrations meets or exceeds the first threshold value, the first data may be retrieved from the solid state memory medium, at 640. For example, storage controller 140A may retrieve the first data from the solid state memory medium of solid state memory media 144AA-144AN. For instance, storage controller 140A may retrieve the first data from the solid state memory medium of solid state memory media 144AA-144AN in response to a determination that the second value associated with the vibrations does not meet or exceed the first threshold value At 645, the first data may be stored via the hard disk drive. For example, storage controller 140A may store the first data via the HDD of HDDs 142AA-142AN. In one or more embodiments, retrieving the first data from the solid state memory medium and storing the first data via the hard disk drive may be performed in response to the determining that the second value associated with the vibrations does not meet or exceed the first threshold value. At 650, second data may be received to store via the hard disk drive. For example, storage controller 140A may receive second data to store via the HDD of HDDs 142AA-142AN. For instance, storage controller 140A may receive the second data to store via the HDD of HDDs 142AA-142AN from the one or more of processor 120, OS 162, and APPs 164-168, among others. At 655, the second data may be stored via the hard disk drive. For example, storage controller 140A may store the second data via the HDD of HDDs 142AA-142AN. At 660, a third value associated with vibrations within the information handling system may be determined. In one example, BMC 130 may determine a third value associated with vibrations within IHS 110. For instance, BMC 130 may utilize a sensor 192 to determine a third value associated with vibrations within IHS 110. In another example, storage controller 140A may determine a third value associated with vibrations within IHS 110. For instance, storage controller 140A may utilize a sensor 192 to determine a third value associated with vibrations within IHS 110.

At 665, it may be determined that that the third value associated with the vibrations meets or exceeds the first threshold value. In one example, BMC 130 may determine that that the third value associated with the vibrations meets or exceeds the first threshold value. In another example, storage controller 140A may determine that the third value associated with the vibrations meets or exceeds the first threshold value. At 670, third data to store via the hard disk drive may be received. For example, storage controller 140A may receive third data to store via the HDD of HDDs 142AA-142AN. At 675, the third data may be stored via the solid state memory medium based at least on determining that the third value associated with the vibrations meets or exceeds the first threshold value. For example, storage controller 140A may store the third data via the solid state memory medium of solid state memory media 144AA-144AN based at least on determining that the third value associated with the vibrations meets or exceeds the first threshold value. For instance, storage controller 140A may store the third data via the solid state memory medium of solid state memory media 144AA-144AN in response to a determination that the third value associated with the vibrations meets or exceeds the first threshold value.

At 680, fourth data to store via the hard disk drive may be received. For example, storage controller 140A may receive fourth data to store via the HDD of HDDs 142AA-142AN. At 685, the fourth data may be stored via the solid state memory medium based at least on determining that the third value associated with the vibrations meets or exceeds the first threshold value. For example, storage controller 140A may store the fourth data via the solid state memory medium of solid state memory media 144AA-144AN based at least on determining that the third value associated with the vibrations meets or exceeds the first threshold value. For instance, storage controller 140A may store the fourth data via the solid state memory medium of solid state memory media 144AA-144AN in response to the determination that the third value associated with the vibrations meets or exceeds the first threshold value.

At 690, a first amount of data stored via the solid state memory medium may be determined. For example, storage controller 140A may determine a first amount of data stored via the memory medium of solid state memory media 144AA-144AN. At 695, it may be determined that the first amount of data stored via the solid state memory medium meets or exceeds a second threshold value. For example, storage controller 140A may determine that the first amount of data stored via the memory medium of the memory media 142AA-142AN meets or exceeds a second threshold value. At 6100, a first message may be provided to at least one of a processor of the information handling system, an operating system executing on the information handling system, and an application executing on the information handling system. For example, storage controller 140A may provide a first message to at least one of processor 120, OS 162 executing on IHS 110, and an APP of APPs 164-168 executing on IHS 110. In one or more embodiments, the first message may include a warning. For example, the warning may indicate a "high water mark". In one instance, the warning may indicate that the solid state memory medium is running low on storage capacity. In one instance, the warning may indicate that the solid state memory medium is almost full. In one or more embodiments, providing the first message to the at least one of the processor of the information handling system, the operating system executing on the information handling system, and the application executing on the information handling system may be performed in response to determining that the first amount of data stored via the solid state memory medium meets or exceeds the second threshold value.

At 6105, fifth data to store via the hard disk drive may be received. For example, storage controller 140A may receive fifth data to store via the HDD of HDDs 142AA-142AN. At 6110, the fifth data may be stored via the solid state memory medium based at least on the determining that the third value associated with the vibrations meets or exceeds the first threshold value. For example, storage controller 140A may store the fifth data via the solid state memory medium of solid state memory media 144AA-144AN based at least on determining that the third value associated with the vibrations meets or exceeds the first threshold value. For instance, storage controller 140A may store the fifth data via the solid state memory medium of solid state memory media 144AA-144AN in response to the determination that the third value associated with the vibrations meets or exceeds the first threshold value.

At 6115, a second amount of data stored via the solid state memory medium may be determined. For example, storage controller 140A may determine a second amount of data stored via the memory medium of memory media 144AA-144AN. At 6120, it may be determined that the second amount of data stored via the solid state memory medium meets or exceeds a third threshold value. For example, storage controller 140A may determine that the second amount of data stored via the memory medium of the memory media 142AA-142AN meets or exceeds a third threshold value. At 6125, a second message may be provided to the at least one of the processor of the information handling system, the operating system executing on the information handling system, and the application executing on the information handling system. For example, storage controller 140A may provide a second message to the at least one of processor 120, OS 162 executing on IHS 110, and an APP of APPs 164-168 executing on IHS 110.

In one or more embodiments, the second message may include another warning. For example, the other warning may indicate another "high water mark". In one instance, the other warning may indicate that the solid state memory medium is running low on storage capacity or has run out of storage capacity. In another instance, the other warning may indicate that the solid state memory medium is almost at storage capacity. In one or more embodiments, the second message may include an error. In one example, the error may indicate that the solid state memory medium has run out of storage capacity. In another example, the error may indicate that the solid state memory medium is at storage capacity. In one or more embodiments, providing the second message to the at least one of the processor of the information handling system, the operating system executing on the information handling system, and the application executing on the information handling system may be performed in response to determining that the second amount of data stored via the solid state memory medium meets or exceeds the third threshold value.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   an air mover;
   at least one processor;
   a storage controller coupled to the at least one processor;
   at least one hard drive coupled to the storage controller;
   at least one solid state memory medium coupled to the storage controller; and
   a memory medium, coupled to the at least one processor, that stores an operating system and at least one application, which are executable by the at least one processor;
   wherein the storage controller is configured to:
      determine a first value associated with vibrations within the information handling system, including determining a duty cycle of the air mover that is associated with a processing power thermal load of the processor, the processing power thermal load indicating a wattage of the processor;
      determine that the first value associated with the vibrations meets or exceeds a first threshold value, including determining that the duty cycle of the air mover is greater than a duty cycle threshold;
      after determining that the first value associated with the vibrations meets or exceeds the first threshold value:
         receive first data to store via the at least one hard disk drive; and
         based at least on determining that the first value associated with the vibrations meets or exceeds the first threshold value, store the first data via the at least one solid state memory medium while maintaining the processing power thermal load of the processor;
      determine a second value associated with vibrations within the information handling system;
      determine that the second value associated with the vibrations does not meet or exceed the first threshold value; and
      in response to determining that the second value associated with the vibrations does not meet or exceed the first threshold value:
         retrieve the first data from the at least one solid state memory medium; and
         store the first data via the at least one hard disk drive.

2. The information handling system of claim 1, wherein the storage controller is further configured to:
   after determining that the second value associated with the vibrations does not meets or exceeds the first threshold value:
      receive second data to store via the at least one hard disk drive; and
      store the second data via the at least one hard disk drive.

3. The information handling system of claim 1, wherein the storage controller is further configured to:
   determine a third value associated with vibrations within the information handling system;
   determine that the third value associated with the vibrations meets or exceeds the first threshold value;
   after determining that the third value associated with the vibrations meets or exceeds the first threshold value:
      receive third data to store via the at least one hard disk drive;
      based at least on determining that the third value associated with the vibrations meets or exceeds the first threshold value, store the third data via the at least one solid state memory medium;
      receive fourth data to store via the at least one hard disk drive;
      based at least on determining that the third value associated with the vibrations meets or exceeds the first threshold value, store the fourth data via the at least one solid state memory medium;
      determine that a first amount of data stored via the at least one solid state memory medium meets or exceeds a second threshold value;
      in response to determining that the first amount of data stored via the solid state memory medium meets or exceeds the second threshold value, provide a first message to at least one of the at least one processor, the operating system, and the at least one application.

4. The information handling system of claim 3, wherein the storage controller is further configured to:
   determine a fourth value associated with vibrations within the information handling system;
   determine that the fourth value associated with the vibrations does not meet or exceed the first threshold value; and
   in response to determining that the fourth value associated with the vibrations does not meet or exceed the first threshold value:
      retrieve the third data from the at least one solid state memory medium; and
      store the third data via the at least one hard disk drive.

5. The information handling system of claim 3, wherein the storage controller is further configured to:
   after determining that the third value associated with the vibrations meets or exceeds the first threshold value:

receive fifth data to store via the at least one hard disk drive;

based at least on determining that the third value associated with the vibrations meets or exceeds the first threshold value, store the fifth data via the solid state memory medium;

determine that a second amount of data stored via the at least one solid state memory medium meets or exceeds a third threshold value;

in response to determining that the second amount of data stored via the at least one solid state memory medium meets or exceeds the third threshold value, provide a second message to the at least one of the at least one processor, the operating system, and the at least one application.

6. The information handling system of claim 5, wherein the storage controller is further configured to:

determine that the third value associated with the vibrations does not meet or exceed the third threshold value; and in response to determining that the third value associated with the vibrations does not meet or exceed the third threshold value:

retrieve the third data from the at least one solid state memory medium;

store the third data via the at least one hard disk drive;

retrieve the fourth data from the at least one solid state memory medium; and store the fourth data via the at least one hard disk drive.

7. The information handling system of claim 1, wherein the at least one solid state memory medium includes at least on of a solid state drive and a solid state volatile memory medium.

8. A method, comprising:

determining a first value associated with vibrations within an information handling system, including determining a duty cycle of an air mover that is associated with a processing power thermal load of a processor, the processing power thermal load indicating a wattage of the processor;

determining that the first value associated with the vibrations meets or exceeds a first threshold value, including determining that the duty cycle of the air mover is greater than a duty cycle threshold;

after the determining that the first value associated with the vibrations meets or exceeds the first threshold value:

receiving first data to store via a hard disk drive; and based at least on the determining that the first value associated with the vibrations meets or exceeds the first threshold value, storing the first data via a solid state memory medium while maintaining the processing power thermal load of the processor;

determining a second value associated with vibrations within the information handling system;

determining that the second value associated with the vibrations does not meet or exceed the first threshold value; and in response to the determining that the second value associated with the vibrations does not meet or exceed the first threshold value:

retrieving the first data from the solid state memory medium; and storing the first data via the hard disk drive.

9. The method of claim 8, further comprising:

after the determining that the second value associated with the vibrations does not meets or exceeds the first threshold value:

receiving second data to store via the hard disk drive; and storing the second data via the hard disk drive.

10. The method of claim 9, further comprising:

determining a third value associated with vibrations within the information handling system;

determining that the third value associated with the vibrations meets or exceeds the first threshold value;

after the determining that the third value associated with the vibrations meets or exceeds the first threshold value:

receiving third data to store via the hard disk drive;

based at least on the determining that the third value associated with the vibrations meets or exceeds the first threshold value, storing the third data via the solid state memory medium;

receiving fourth data to store via the hard disk drive;

based at least on the determining that the third value associated with the vibrations meets or exceeds the first threshold value, storing the fourth data via the solid state memory medium;

determining that a first amount of data stored via the solid state memory medium meets or exceeds a second threshold value;

in response to the determining that the first amount of data stored via the solid state memory medium meets or exceeds the second threshold value, providing a first message to at least one of a processor of the information handling system, an operating system executing on the information handling system, and an application executing on the information handling system.

11. The method of claim 10, further comprising:

determining a fourth value associated with vibrations within the information handling system;

determining that the fourth value associated with the vibrations does not meet or exceed the first threshold value; and in response to the determining that the fourth value associated with the vibrations does not meet or exceed the first threshold value:

retrieving the third data from the solid state memory medium; and storing the third data via the hard disk drive.

12. The method of claim 10, further comprising:

after the determining that the third value associated with the vibrations meets or exceeds the first threshold value:

receiving fifth data to store via the hard disk drive;

based at least on the determining that the third value associated with the vibrations meets or exceeds the first threshold value, storing the fifth data via the solid state memory medium;

determining that a second amount of data stored via the solid state memory medium meets or exceeds a third threshold value;

in response to the determining that the second amount of data stored via the solid state memory medium meets or exceeds the third threshold value, providing a second message to the at least one of the processor of the information handling system, the operating system executing on the information handling system, and the application executing on the information handling system.

13. The method of claim 12, further comprising:
determining that the third value associated with the vibrations does not meet or exceed the third threshold value; and
in response to the determining that the third value associated with the vibrations does not meet or exceed the third threshold value:
retrieving the third data from the solid state memory medium;
storing the third data via the hard disk drive;
retrieving the fourth data from the solid state memory medium; and
storing the fourth data via the hard disk drive.

14. The method of claim 8, wherein the solid state memory medium includes at least on of a solid state drive and a solid state volatile memory medium.

15. A storage controller, comprising:
a processor;
a memory medium that includes instructions that, when executed by the processor, cause the storage controller to:
determine a first value associated with vibrations within an information handling system, including determining a duty cycle of an air mover that is associated with a processing power thermal load of the processor, the processing power thermal load indicating a wattage of the processor;
determine that the first value associated with the vibrations meets or exceeds a first threshold value, including determining that the duty cycle of the air mover is greater than a duty cycle threshold;
after determining that the first value associated with the vibrations meets or exceeds the first threshold value:
receive first data to store via at least one hard disk drive coupled to the storage controller; and
based at least on determining that the first value associated with the vibrations meets or exceeds the first threshold value, store the first data via at least one solid state memory medium coupled to the storage controller while maintaining the processing power thermal load of the processor;
determine a second value associated with vibrations within the information handling system;
determine that the second value associated with the vibrations does not meet or exceed the first threshold value; and
in response to determining that the second value associated with the vibrations does not meet or exceed the first threshold value:
retrieve the first data from the at least one solid state memory medium; and
store the first data via the at least one hard disk drive.

16. The storage controller of claim 15, wherein the instructions further cause the storage controller to:
after determining that the second value associated with the vibrations does not meets or exceeds the first threshold value:
receive second data to store via the at least one hard disk drive; and
store the second data via the at least one hard disk drive.

17. The storage controller of claim 15, wherein the instructions further cause the storage controller to:
determine a third value associated with vibrations within the information handling system;
determine that the third value associated with the vibrations meets or exceeds the first threshold value;
after determining that the third value associated with the vibrations meets or exceeds the first threshold value:
receive third data to store via the at least one hard disk drive;
based at least on determine that the third value associated with the vibrations meets or exceeds the first threshold value, store the third data via the at least one solid state memory medium;
receive fourth data to store via the at least one hard disk drive;
based at least on determining that the third value associated with the vibrations meets or exceeds the first threshold value, store the fourth data via the at least one solid state memory medium;
determine that a first amount of data stored via the at least one solid state memory medium meets or exceeds a second threshold value;
in response to determining that the first amount of data stored via the solid state memory medium meets or exceeds the second threshold value, provide a first message to at least one of the at least one processor, the operating system, and the at least one application.

18. The storage controller of claim 17, wherein the instructions further cause the storage controller to:
determine a fourth value associated with vibrations within the information handling system;
determine that the fourth value associated with the vibrations does not meet or exceed the first threshold value; and
in response to determining that the fourth value associated with the vibrations does not meet or exceed the first threshold value:
retrieve the third data from the at least one solid state memory medium; and
store the third data via the at least one hard disk drive.

19. The storage controller of claim 17, wherein the instructions further cause the storage controller to:
after determining that the third value associated with the vibrations meets or exceeds the first threshold value:
receive fifth data to store via the at least one hard disk drive;
based at least on determining that the third value associated with the vibrations meets or exceeds the first threshold value, store the fifth data via the solid state memory medium;
determine that a second amount of data stored via the at least one solid state memory medium meets or exceeds a third threshold value;
in response to determining that the second amount of data stored via the at least one solid state memory medium meets or exceeds the third threshold value, provide a second message to the at least one of the at least one processor of the information handling system, the operating system, and the application.

20. The storage controller of claim 19, wherein the instructions further cause the storage controller to:
determine that the third value associated with the vibrations does not meet or exceed the third threshold value; and
in response to determining that the third value associated with the vibrations does not meet or exceed the third threshold value:
retrieve the third data from the at least one solid state memory medium;

store the third data via the at least one hard disk drive;
retrieve the fourth data from the at least one solid state memory medium; and
store the fourth data via the at least one hard disk drive.

\* \* \* \* \*